United States Patent

Sebern

[15] 3,653,279
[45] Apr. 4, 1972

[54] DIFFERENTIAL FLUID COUPLING DRIVE

[72] Inventor: James R. Sebern, Decatur, Ill.
[73] Assignee: Caterpillar Tractor Co., Peoria, Ill.
[22] Filed: Nov. 23, 1970
[21] Appl. No.: 91,976

[52] U.S. Cl. .............................. 74/710.5, 74/650, 74/677, 74/720
[51] Int. Cl. .............................. F16h 1/44, F16h 47/06
[58] Field of Search ............ 74/710.5, 720, 718, 650, 655, 74/674, 677

[56] References Cited

UNITED STATES PATENTS

| 2,353,060 | 7/1944 | Norman | 74/650 |
| 2,360,234 | 10/1944 | Jandasek | 74/720 X |
| 2,468,107 | 4/1949 | Powell | 74/650 |
| 2,549,557 | 4/1951 | Yancho et al. | 74/650 X |
| 3,323,389 | 6/1967 | Hause | 74/710.5 |
| 3,338,115 | 8/1967 | Ritzema | 74/720 X |

FOREIGN PATENTS OR APPLICATIONS

| 1,083,417 | 6/1954 | France | 74/677 |

Primary Examiner—Carlton R. Croyle
Assistant Examiner—Thomas C. Perry
Attorney—Fryer, Tjensvold, Feix, Phillips & Lempio

[57] ABSTRACT

A differential fluid coupling drive wherein a pair of fluid couplings in conjunction with an intermediate planetary type differential and lock-up clutch are employed to deliver power from a single engine to two separate dual power shift transmissions respectively driving opposite side wheels of a vehicle. The drive allows a normal differential action at small differences in wheel speeds, as in turning, but has high resistance to large wheel speed differentials, such as when one wheel loses traction.

7 Claims, 2 Drawing Figures

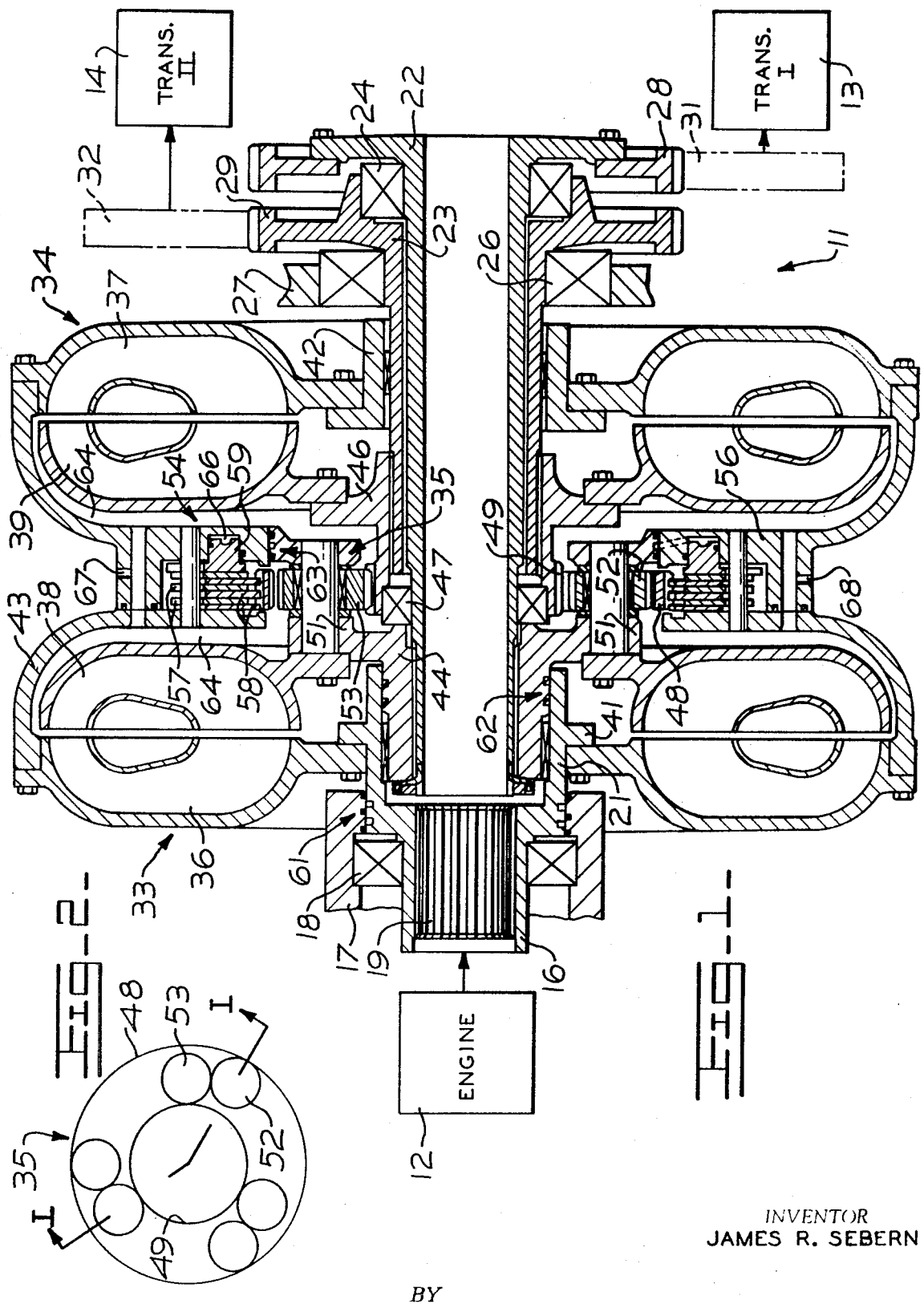

3,653,279

DIFFERENTIAL FLUID COUPLING DRIVE

BACKGROUND OF THE INVENTION

Dual power shift transmissions are employed in various tractors and other vehicles to independently drive opposite side wheels thereof through separate hydrodynamic couplings. In driving the separate wheel transmission systems from a single engine, it is necessary that a differential action be provided therebetween in order to permit turning of the wheels at different speeds. However, it is desirable that the normal differential action be effective only at relatively low wheel speed differences and that when one wheel loses traction, spinning of such wheel be opposed and increased torque be delivered to the nonslipping wheel.

In other words, it is preferable that a controlled slip differential system be provided with biased opposition to wheel speed differential varying from zero at low wheel speed differences to a maximum at high speed differences. Although various limited slip differentials have been devised heretofore, they have involved relatively complex control systems and have been limited in the amount of torque delivered to the nonslipping wheel under excessive slip conditions.

SUMMARY OF THE INVENTION

The present invention relates to a compact, relatively simple differential fluid coupling drive with controlled slip which is capable under slip conditions of delivering considerably more torque to the nonslipping wheel than a conventional differential.

A differential fluid coupling drive in accordance with the present invention generally includes a pair of fluid couplings each having an impeller member and a runner element. The impeller members of the couplings are arranged for ganged direct connection to an engine, while the runner elements are connected to separate output gears respectively adapted to drive, for example, two separate power shift transmissions associated with opposite side wheels of a vehicle.

Intermediate the fluid couplings there is provided a planetary gear set comprising a ring gear, an internal sun gear, and planet carrier with planet gears meshed with the ring and sun gears. The sun gear is coupled to the runner element of one fluid coupling while the planet carrier is coupled to the runner element of the other fluid coupling.

Finally, a friction clutch is provided between the impellers of the fluid couplings and the ring gear of the planetary set, such that upon engagement of the clutch, the engine input at the impellers is directly connected to the ring gear. With the clutch disengaged, the planetary set does not function.

As an important feature of the foregoing differential fluid coupling drive when employed with two separate dual shift transmissions, the clutch may be disengaged such that each transmission and its associated wheel is driven independently by its own fluid coupling, thus allowing soft pick-up of the load and absorption of shocks caused by shift transients and the like. This mode may be the normal condition of operation in the lower transmission gears, for example the first two speeds.

In accordance with another important feature of the drive, the clutch may be engaged such that the system gives true differential action while locking out overall slip of the fluid couplings. Moreover, both couplings resist spinning of the wheel losing traction, thereby increasing the torque on the other wheel and minimizing slip. This mode may be the normal condition of operation in the intermediate and high transmission gears, for example the top six gears.

An important advantage of the drive is that more torque is delivered to the nonslipping wheel in either the engaged or disengaged mode than with a conventional differential.

Another advantage is that the planetary of epicyclic gearing of the drive gives the same action as a bevel gear differential in considerably less axial space, thereby providing a relatively compact unit.

A further advantage resides in the symmetrical arrangement of the fluid couplings with planetary set located between them, whereby thrust forces can be balanced and the bearing arrangement simplified.

BRIEF DESCRIPTION OF THE DRAWING

FIG. 1 is a sectional view, partially in schematic, of a differential fluid coupling drive in accordance with the present invention.

FIG. 2 is a transverse section through the embodiment of FIG. 1, depicting the arrangement of a planetary gear set thereof.

DETAILED DESCRIPTION OF THE INVENTION

Referring now to the drawing in detail, a differential fluid coupling drive in accordance with the present invention is indicated at 11 for coupling an engine 12 to two separate power shift transmissions 13 and 14 respectively associated with opposite side wheels of a vehicle such as the tractor of a tractor-scraper combination.

The drive 11 includes an input shaft 16 journalled for rotation within a housing 17 by means of a roller bearing 18, and internally splined, as indicated at 19, for connection to the output shaft of engine 12. The shaft 16 is preferably formed with a cylindrical cupped hub 21 which projects coaxially beyond the bearing 18.

Concentric output shafts 22 and 23 are coaxially aligned with input shaft 16, the inner output shaft 22 extending coaxially within hub 21 in inwardly spaced relation thereto, and the outer output shaft 23 coaxially longitudinally spaced therefrom. The distal ends of the output shafts with respect to the input shaft are journalled for relative rotation by means of an interposed roller bearing 24, while journalled support of the output shafts is afforded as by means of a roller bearing 26 interposed between the outer shaft 23 and a rigid support, indicated at 27. In addition, the distal ends of shafts 22 and 23 are respectively provided with output gears 28 and 29 for driving transmissions 13 and 14 through the intermediary of gears 31 and 32.

In order to provide fluid-differential coupling between the input shaft 16 and output shafts 22 and 23, drive 11 includes a pair of coaxially spaced fluid couplings 33 and 34 and a coaxially intermediate planetary gear set, which is generally indicated at 35 and best shown in FIG. 2.

Fluid couplings 33 and 34 respectively include annular impeller members 36 and 37 and coaxially facing annular runner elements 38 and 39 in fluid coupled rotatable relation to the impellers. The impeller members 36 and 37 are disposed outwardly while the runner elements 38 and 39 are inwardly disposed in coaxially spaced adjacent relation. Impeller member 36 is fixedly secured to an outwardly flared annular flange 41 of the hub 21 of input shaft 16, and impeller member 37 is fixedly secured to a collar 42 concentrically rotatable about outer output shaft 23. Impeller members 36 and 37 are ganged by means of a generally cylindrical coaxially interconnecting coupling element 43. In this manner, the impeller members of both fluid couplings 33 and 34 are rotatable with the input shaft 16.

The runner element 38 of fluid coupling 33 is coaxially secured to a hub 44 of inner output shaft 22, which hub is rotatable within hub 21 of input shaft 16. The runner element 39 of fluid coupling 34 is similarly coaxially secured to a hub 46 of outer output shaft 23. Hub 46 is rotatably coaxially supported on inner output shaft 22 by means of an interposed bearing 47. It will be thus appreciated that the runner elements of fluid couplings 33 and 34 are respectively rotatable with the inner and outer output shafts 22 and 23.

Considering now in detail the planetary gear set 35, same will be seen to comprise an outer ring gear 48, an inner sun gear 49, and a planet carrier 51 containing two sets of planet gears 52 and 53. Planet gears 52 and 53 mesh with each other and respectively mesh with ring gear 48 and sun gear 49. The number of teeth in ring gear 48 divided by the number of teeth in sun gear 49 is selected to be equal to two. The ring gear 48 may then be employed as an input and the planet carrier 51 and sun gear 49 as outputs having the torque equally split therebetween in a manner known in the art. Carrier 51 is directly connected to runner element 38 of fluid coupling 33, while sun gear 49 is concentrically secured to hub 46 of outer output shaft 23. Thus, the equal torque outputs of planetary set 35 are respectively connected to the output shafts 22 and 23.

In order to facilitate selective connection of input shaft 16 to the ring gear input of planetary set 35, a friction clutch 54 is provided between the impeller coupling element 43 and ring gear 48. More particularly, a clutch housing 56 is carried interiorly of the impeller coupling element 43, and interleaved sets of clutch discs 57 and 58 disposed within the housing are respectively secured to the housing and to the ring gear. The clutch further includes a rotating piston 59 within housing 56 for selectively frictionally engaging the discs 57 and 58 to thereby couple the input represented by the impeller members to the ring gear.

In order to facilitate the entry of filling and cooling oil for the fluid couplings 33 and 34 and the clutch 54, piston ring seals 61 and 62 are respectively provided between housing 17 and hub 21 and between hub 21 and hub 44. Piston ring seals 63 are similarly provided between planet carrier 51 and clutch housing 56. Oil may then be introduced from housing 17 to flow paths through hubs 21 and 44 extending to the central chamber defined within impeller coupling element 43 and surrounding planetary set 36 where the oil flows outwardly as at 64 into the couplings 33 and 34.

Similarly, a second path may be provided for pressure oil extending from housing 17 through hubs 21 and 44 and the planetary carrier 51 at seals 63 to a clutch piston cavity 66 within clutch housing 56. Two orifices 67 and 68 are provided in impeller coupling element 43 as bleed paths to insure positive flow control of oil through the fluid couplings for the purpose of cooling and to control fill level of the couplings.

Considering now the operation of the differential fluid coupling drive 11, it is to be noted that two operational modes may be effected. In the first mode couplings 33 and 34 are fully charged from any suitable hydraulic source and clutch 54 is disengaged. This mode is the normal condition of operation in the lower gears of transmissions 13 and 14, for example, the first two speeds.

Since the clutch is disengaged, ring gear 48 is decoupled from impeller members 36 and 37 and planet set 35 is not functioning. The impeller members consequently operate as a direct function of the speed of engine 12 and the runner elements 38 and 39 correspondingly drive output shafts 22 and 23. As a result, each of the transmissions 13 and 14 respectively coupled to the output shafts independently drives its own wheel system through its own hydrodynamic coupling. Assuming the vehicle is operating in a straight-ahead condition, the runner elements 38 and 39 slip approximately the same amount. A major feature is that if one of the wheels slips appreciably, considerably more torque is delivered to the non-slipping wheel than with a conventional differential.

In the second mode of operation, fluid couplings 33 and 34 are normally charged and clutch 54 is engaged. This mode is employed in the intermediate and high gears of transmissions 13 and 14, for example the top six gears. Under this condition, the input shaft 16 is connected to the ring gear 48 of planetary set 35 as well as to the impeller members of fluid couplings 33 and 34. The system now acts as a true differential and couplings 33 and 34 slip in opposite directions. Assuming straight-ahead operation, the planetary set 35 directs equal torque to both transmissions 13 and 14. Overall slip of the fluid couplings is locked out by the clutch 54, but relative difference in speeds of the two wheels is permitted by action of planetary gear set 35.

However, when one wheel loses traction, both fluid couplings oppose excessive slip. In other words, the drive 11 has the effect of a biased differential with bias varying from zero at low wheel speed differences up to full capacity of the couplings at high speed differences.

It will be recognized that the coupling drive of the present invention can be utilized to power two independent axles instead of the two wheels described above. It may be desirable to deliver more torque to one such axle than the other. In such event, the ratio of the teeth in the differential ring gear to those in the sun gear can be varied from 2 to 1 to any desired ratio to provide the unequal division of torque.

Although the invention has been hereinbefore described and illustrated in the accompanying drawing with respect to a single preferred embodiment, various modifications and changes may be made therein without departing from the true spirit and scope of the invention, and thus it is not intended to limit the invention except by the terms of the appended claims.

What is claimed is:

1. A differential fluid coupling drive comprising an input shaft, first and second output shafts, first and second fluid couplings each having an impeller member and a runner element in fluid coupled rotational relation to the impeller member, means directly connecting said impeller members of said couplings to said input shaft for rotation therewith, a planetary gear set including a ring gear, an internal sun gear, and a planet carrier with planet gears meshed with said ring and sun gears, means directly connecting said carrier to said first output shaft and said runner element of said first coupling, means directly connecting said sun gear to said second output shaft and said runner element of said second coupling, and clutch means for selectively connecting said input shaft to said ring gear.

2. A differential fluid coupling drive according to claim 1, further defined by said planetary gear set having two sets of planet gears carried by said carrier, said sets of planet gears meshing with each other and respectively meshing with said ring gear and said sun gear, said ring gear having twice the number of teeth as said sun gear.

3. A differential fluid coupling drive according to claim 1, further defined by said fluid couplings being disposed in coaxially spaced relation, said planetary gear set being coaxially disposed between said fluid couplings, said impeller members being ganged by a generally cylindrical coaxial interconnecting coupling element coaxially outwardly spaced from said ring gear, and said clutch means being a friction clutch acting between said coupling element and said ring gear.

4. A differential fluid coupling drive according to claim 3, further defined by said planetary gear set having two sets of planet gears carried by said carrier, said planet gears meshing with each other and respectively meshing with said ring gear and said sun gear, said ring gear having twice the number of teeth as said sun gear.

5. A differential fluid coupling drive according to claim 1, further defined by said second output shaft being concentrically rotatable on said first output shaft, said output shafts being coaxially aligned with said input shaft, said fluid couplings being coaxially longitudinally spaced apart, said impeller member and runner element of each coupling being annular and disposed in coaxial facing relation, said impeller members of said couplings being ganged by a generally cylindrical coaxially interconnecting coupling element, said planetary gear set being coaxially disposed intermediate said first and second couplings in coaxially inwardly spaced relation to said interconnecting coupling element, said impeller member of said first coupling being coaxially outwardly secured to said input shaft, said runner element of said first coupling being coaxially outwardly secured to said first output shaft and coaxially secured to said carrier, said runner element of said second coupling and said sun gear being coaxially outwardly secured to said second output shaft, and said clutch means being a friction clutch coaxially acting between said interconnecting coupling element and said ring gear.

6. A differential fluid coupling drive according to claim 5, further defined by a bearing rotatably supporting said input shaft within a fixed housing, second and third bearings coaxially interposed between said first and second output shafts at longitudinally spaced positions thereof, and a fourth bearing rotatably supporting said second output shaft from a fixed support.

7. A differential fluid coupling according to claim 6, further defined by said planetary gear set having two sets of planet gears carried by said carrier, said planet gears meshing with each other and respectively meshing with said ring gear and said sun gear, said ring gear having twice the number of teeth as said sun gear.

* * * * *